United States Patent [19]

Bayer

[11] Patent Number: 5,263,560
[45] Date of Patent: Nov. 23, 1993

[54] VIBRATION DAMPING SUPPORTING STRUT FOR A MOTOR VEHICLE

[75] Inventor: Heinz Bayer, Ulm, Fed. Rep. of Germany

[73] Assignee: Dr. Ing. h.c.F. Porsche AG, Fed. Rep. of Germany

[21] Appl. No.: 11,840

[22] Filed: Feb. 1, 1993

Related U.S. Application Data

[63] Continuation of Ser. No. 854,837, Mar. 20, 1992, abandoned.

Foreign Application Priority Data

Mar. 23, 1991 [DE] Fed. Rep. of Germany ....... 4109608

[51] Int. Cl.⁵ .................. F16F 7/00; B60G 13/16
[52] U.S. Cl. .................. 188/380; 188/267; 267/140.14; 267/226
[58] Field of Search .......... 188/380, 267, 279, 322.22, 188/314; 267/64.26, 221, 225, 226, 136, 137, 140.14, 140.15, 195, 217, 289

[56] References Cited

U.S. PATENT DOCUMENTS

| | | | |
|---|---|---|---|
| 2,627,405 | 2/1953 | Hlatko et al. | 267/221 X |
| 2,797,931 | 7/1957 | Hans | 188/380 X |
| 3,083,032 | 3/1963 | Cuskie | 267/225 X |
| 3,316,581 | 5/1967 | Hornsby | 267/289 X |
| 4,251,064 | 2/1981 | Camilleri | 267/136 |
| 4,310,149 | 1/1982 | Camilleri | 188/380 X |
| 4,351,515 | 9/1982 | Yoshida | 188/267 X |
| 4,518,058 | 5/1985 | Fister et al. | 267/225 X |

FOREIGN PATENT DOCUMENTS

| | | |
|---|---|---|
| 0229902 | 7/1987 | European Pat. Off. . |
| 2237058 | 2/1974 | Fed. Rep. of Germany . |
| 2841354 | 4/1980 | Fed. Rep. of Germany ...... 267/221 |
| 0575710 | 8/1924 | France ................. 267/221 |
| 0978864 | 11/1950 | France ................. 267/136 |
| 0944596 | 12/1963 | United Kingdom ........ 188/314 |
| 1057455 | 2/1967 | United Kingdom . |

OTHER PUBLICATIONS

English version of European Search Report.
European Search Report of EP 10 2130 dated Jul. 1, 1992.

Primary Examiner—Robert J. Oberleitner
Assistant Examiner—Peter M. Poon
Attorney, Agent, or Firm—Evenson, McKeown, Edwards & Lenahan

[57] ABSTRACT

For the absorbing of natural frequencies of the vehicle body, a vibration damping supporting strut for a motor vehicle has an axially movable absorber mass in a hollow space of the piston rod extending in the direction of the longitudinal axis. The absorber mass is in each case supported on its ends by way of a spring element arranged in a clearance of the hollow space. These clearances are filled with a medium and are connected with one another by at least one passage in the absorber mass. This construction results in an absorber effect on the natural torsional frequency of the vehicle body in that an absorbing takes place of the high-energy shock portions which have the same frequency and are introduced from the power section by way of the piston rod, whereby the shocks exciting the vehicle body are then largely absorbed.

11 Claims, 1 Drawing Sheet

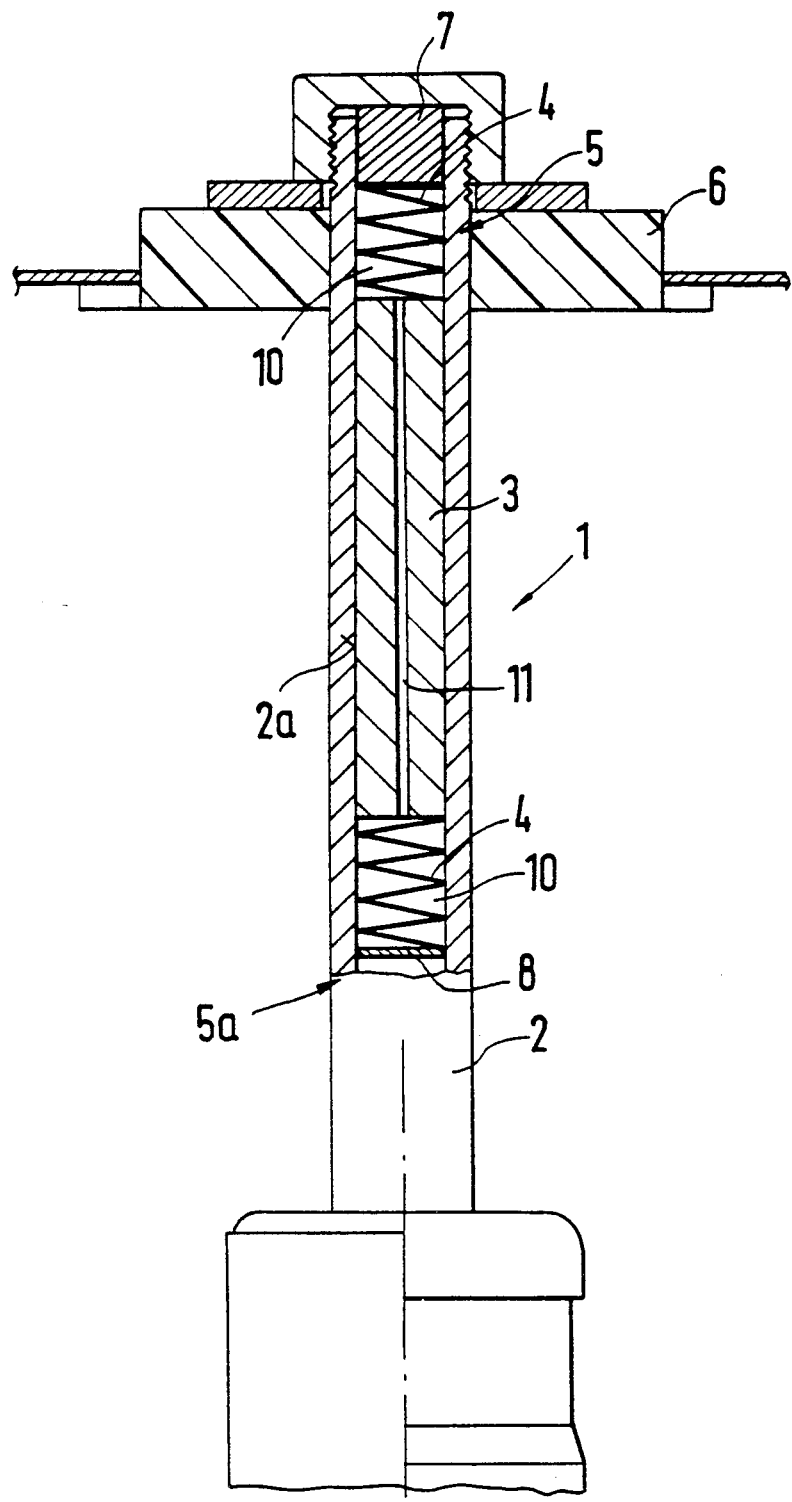

VIBRATION DAMPING SUPPORTING STRUT FOR A MOTOR VEHICLE

This is a continuation, of application Ser. No. 07/854,837, filed Mar. 20, 1992, now abandoned.

BACKGROUND AND SUMMARY OF THE INVENTION

This invention relates to a vibration damping supporting strut for a motor vehicle for absorbing vehicle body natural frequency vibrations.

Shock absorber struts are known in the case of vehicles which, for the absorbing of natural torsional frequencies of the vehicle body have an absorber mass on the piston rod in the area of its support on the vehicle body. Because of the required space in this area, this arrangement presents problems, and furthermore, an absorber mass which is arranged in this manner is subjected to exterior influences.

It is an object of the invention to develop a supporting strut for a motor vehicle in such a manner that, while an additional space requirement is avoided, an effective absorbing of natural torsional frequencies of the vehicle body is ensured.

According to the invention, this object is achieved providing a strut arrangement disposable between a motor vehicle body and a wheel suspension element for absorbing natural frequencies of a vehicle body, said strut arrangement comprising:

a piston rod held in an elastic bearing at a vehicle body part, said piston rod including a longitudinally extending hollow space therein, an absorber mass disposed in the hollow space to be axially movable therein with first and second clearance spaces at respective opposite ends of the absorber mass, a first spring element disposed in the first clearance space and supporting the absorber mass, a second spring element disposed in the second clearance space and supporting the absorber mass, a fluid medium filling the first and second clearance spaces, and a fluid connection between the first and second clearance spaces.

By means of the development of the supporting strut according to the invention with an absorber mass which can be axially moved inside the piston rod and can be damped by means of a liquid or gaseous medium, on the one hand, a targeted absorbing of the natural torsional frequencies of the vehicle body can be achieved and, at the same time, a compact interior unit is created which is protected from exterior influences.

The absorber mass is in each case on the end side axially slidably supported by way of spring elements, such as coil springs, and is held in an inoperative position. By means of filling the clearances receiving the spring elements with the liquid or gaseous medium, a damping of the absorber mass is achieved. In another advantageous embodiment, the medium may also consist of an electroviscous liquid which can be adjusted by means of an applied voltage, and the vibration band width can therefore be varied.

The absorber mass has a passage, such as a longitudinal bore, which connects the two clearances with one another in the hollow space of the piston rod, whereby the liquid present in these spaces, in the case of an axial movement of the absorber mass, can flow from one space into the other space.

The bearing of the absorber mass in the hollow piston rod is constructed such that the same frequency is achieved as the natural torsional frequency of the vehicle body, and thus an effective reduction of the vibrations of the vehicle body can be achieved. In particular, the absorbing effect on the natural torsional frequency of the vehicle body is generated by the fact that an additional absorbing takes place of the highenergy shock portions of the same frequency introduced from the power unit by way of the piston rod, whereby then the shocks exciting the vehicle body are largely absorbed.

Other objects, advantages and novel features of the present invention will become apparent from the following detailed description of the invention when considered in conjunction with the accompanying drawings.

BRIEF DESCRIPTION OF THE DRAWINGS

The single drawing figure is a schematic, part sectional view of a shock absorber strut arrangement constructed according to a preferred embodiment of the invention.

DETAILED DESCRIPTION OF THE DRAWINGS

The shock absorber strut 1 of a motor vehicle comprises a piston rod 2 with a hollow space 2a which extends along the longitudinal axis and in which a slidable absorber mass 3 is held in position at both ends by way of spring elements 4. These spring elements 4 may, for example, be coil springs, concertina (bellows type) walls, disk spring assemblies or rubber spring elements. The free end 5 of the piston rod 2 is held in an elastic bearing 6 of the vehicle body, the lower end of the shock absorber strut I, which faces away, being disposed on a wheel suspension element which is not shown.

The absorber mass 3 is damped by way of a medium which is provided in the closed-off clearances 10 which accommodate the spring elements 4. This medium may be either gaseous and consist, for example, of air, or may be liquid and consist, for example, of a hydraulic oil or of an electroviscous liquid. By means of this electroviscous liquid, it is possible by means of the application of different electric voltages to adjust a desired vibration band width during the operation. A control of the electric voltage is contemplated as a function of driving conditions.

At the free upper end 5 of the piston rod 2, the hollow space 2a is closed off by a stopper 7 and, at the lower end 5a, which faces away, is bounded by a closing plate 8, the stopper 7 and the closing plate 8 forming axial supports for the spring elements 4.

A passage 11, such as a longitudinal bore, is provided in the absorber mass 3 which connects the two clearances 10 with one another at both ends 5 and 5a of the absorber mass 3 in the piston rod 2 so that the medium can flow from one clearance to the other clearance in a throttled manner.

The spring elements 4 hold the absorber mass 3 in a zero position, the damping taking placing by way of the medium in the clearance 10 so that an effective absorbing of the natural torsional frequency of the vehicle body is achieved, the frequency of the absorber mass 3 coinciding essentially with the natural torsional frequency.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A vibration damping strut arrangement disposable between a motor vehicle body and a wheel suspension element for absorbing natural frequencies of a vehicle body, said strut arrangement comprising:
   a piston rod held in an elastic bearing at a vehicle body part, said piston rod including a longitudinally extending hollow space therein,
   an absorber mass disposed in the hollow space to be axially movable therein with first and second clearance spaces at respective opposite ends of the absorber mass,
   a first spring element disposed in the first clearance space and supporting the absorber mass,
   a second spring element disposed in the second clearance space and supporting the absorber mass,
   a fluid medium filling the first and second clearance spaces,
   a fluid connection between the first and second clearance spaces, said hollow space at the lower end of the piston rod is bounded by a sealingly arranged closing plate and, at the upper end, is bounded by a sealingly arranged stopper, wherein this stopper as well as the closing plate are used as a support for the spring elements, and said stopper and said closing plate are arranged within said hollow space.

2. A supporting strut arrangement according to claim 1, wherein the absorber mass has a frequency which is identical to the natural torsional frequency of the vehicle body.

3. A supporting strut arrangement according to claim 2, wherein the hollow space at the lower end of the piston rod is bounded by a sealingly arranged closing plate and, at the upper end, is bounded by a sealingly arranged stopper, and wherein this stopper as well as the closing plate are used as a support for the spring elements.

4. A supporting strut arrangement according to claim 3, wherein the fluid medium in each clearance consists of a liquid medium.

5. A supporting strut arrangement according to claim 3, wherein the fluid medium in each clearance consists of a gaseous medium.

6. A supporting strut arrangement according to claim 3, wherein the fluid medium in each clearance consists of an electroviscous liquid which can be subjected to an electric voltage and can thereby be controlled as a function of parameters of the vehicle.

7. A supporting strut arrangement according to claim 1, wherein the fluid medium in each clearance consists of an electroviscous liquid which can be subjected to an electric voltage and can thereby be controlled as a function of parameters of the vehicle.

8. A supporting strut arrangement according to claim 1, wherein the fluid medium in each clearance consists of a liquid medium.

9. A supporting strut arrangement according to claim 1, wherein the fluid medium in each clearance consists of a gaseous medium.

10. A supporting strut arrangement according to claim 1, wherein the fluid medium in each clearance consists of an electroviscous liquid which can be subjected to an electric voltage and can thereby be controlled as a function of parameters of the vehicle.

11. A supporting strut according to claim 1, wherein said fluid connection is a fluid passage through the absorber mass.

* * * * *